(12) United States Patent
Tsai et al.

(10) Patent No.: US 11,294,243 B2
(45) Date of Patent: Apr. 5, 2022

(54) DISPLAY DEVICE

(71) Applicant: Coretronic Corporation, Hsin-Chu (TW)

(72) Inventors: Wen-Chin Tsai, Hsin-Chu (TW); Yin-Jen Lin, Hsin-Chu (TW)

(73) Assignee: Coretronic Corporation, Hsin-Chu (TW)

(*) Notice: Subject to any disclaimer, the term of this patent is extended or adjusted under 35 U.S.C. 154(b) by 104 days.

(21) Appl. No.: 16/854,906

(22) Filed: Apr. 22, 2020

(65) Prior Publication Data

US 2020/0348547 A1    Nov. 5, 2020

(30) Foreign Application Priority Data

May 5, 2019    (CN) .......................... 201920624877.6

(51) Int. Cl.
| | | |
|---|---|---|
| *G02F 1/1339* | (2006.01) | |
| *G02F 1/1677* | (2019.01) | |
| *G02F 1/1335* | (2006.01) | |
| *G02F 1/1333* | (2006.01) | |
| *G02F 1/16753* | (2019.01) | |
| *F21V 8/00* | (2006.01) | |
| *G02F 1/167* | (2019.01) | |

(52) U.S. Cl.
CPC ......... *G02F 1/1339* (2013.01); *G02B 6/0088* (2013.01); *G02F 1/133308* (2013.01); *G02F 1/133512* (2013.01); *G02F 1/1677* (2019.01); *G02F 1/16753* (2019.01); *G02F 1/133314* (2021.01); *G02F 1/133317* (2021.01); *G02F 1/167* (2013.01); *G02F 2201/16* (2013.01); *G02F 2201/44* (2013.01)

(58) Field of Classification Search
CPC .. G02F 1/1339; G02F 1/16753; G02F 1/1677; G02F 1/133308; G02F 1/133512; G02F 1/133314; G02F 1/133317; G02F 1/167; G02B 6/0088
See application file for complete search history.

(56) References Cited

U.S. PATENT DOCUMENTS

| | | | | |
|---|---|---|---|---|
| 2005/0073637 A1* | 4/2005 | Liao | ...................... | G02F 1/1339 349/153 |
| 2011/0310085 A1* | 12/2011 | Mimura | ............... | G09G 3/2003 345/214 |
| 2018/0138447 A1* | 5/2018 | Jin | ........................... | H01L 51/56 |
| 2018/0335662 A1* | 11/2018 | Iwase | .................... | H04N 13/305 |

FOREIGN PATENT DOCUMENTS

KR    20020094785    12/2002

* cited by examiner

*Primary Examiner* — Andrew J Coughlin
*Assistant Examiner* — Jessica M Apenteng
(74) *Attorney, Agent, or Firm* — JCIPRNET

(57) ABSTRACT

The invention provides a display device, which includes a display panel and at least one optical device. The display panel has a display region and a display surface. The at least one optical device is overlapped with the display panel. The optical device has a low-reflectivity sealant pattern. An angle of 45 degrees is included between the display surface of the display panel and a connecting line of a side edge of the display region and the low-reflectivity sealant pattern. An inner edge of the low-reflectivity sealant pattern and the display region are located on the same side of the connecting line. The display device of the invention has good light emitting uniformity at different viewing angles.

9 Claims, 6 Drawing Sheets

DISPLAY DEVICE

CROSS-REFERENCE TO RELATED APPLICATION

This application claims the priority benefit of China application serial no. 201920624877.6, filed on May 5, 2019. The entirety of the above-mentioned patent application is hereby incorporated by reference herein and made a part of this specification.

BACKGROUND OF THE INVENTION

1. Field of the Invention

The invention generally relates to a display device, and in particular, to a display device with a low-reflectivity sealant pattern.

2. Description of Related Art

In recent years, along with development of display technologies, display performance and functions of consumer display devices (for example, smart TVs and electronic sports displays) have been constantly improved, for example, ultrahigh definition, high contrast, high frame rate and functions of anti-peep or stereoscopic display. For realizing the functions, an additional optical device (for example, viewing angle controllers or electrically controlled liquid crystal lenses) is correspondingly arranged in display regions of display panels to meet usage requirements of consumers. On another aspect, for consumers, besides improvement of the display performance and the functions, the overall appearance design (for example, bezel less and thinning) also gradually becomes one of important indexes considered by the consumers while purchasing.

Generally speaking, such an additional optical device for improving functions of a display device mostly has a sealant layer located on a periphery of a light transmission region (display region, for example), and a specific space is required between the sealant layer of the additional optical device and an edge of a display region of the display panel to avoid abnormal light leakage formed at the edge of the display region by the sealant layer under illumination of a beam emitted by a light source (for example, a backlight module or the display panel), or abnormal reflection formed at the edge of the display region by the sealant layer under illumination of an image beam and an external ambient beam. For example, abnormal light leakage at an edge of a display picture of a display is usually inspected at a side viewing angle of 45 degrees, and thus the sealant layer of the additional optical device usually requires to be arranged outside a visible range of the side viewing angle of 45 degrees. However, reservation of such a space limits a dimensional design of the optical device, may even cause the condition that a width of the optical device is required to be larger than a width of the display device, and has become a limit to reduction of a non-display region of the display device for a bezel less design. Therefore, how to solve the dilemma has become one of important subjects about the appearance design for related manufacturers.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention was acknowledged by a person of ordinary skill in the art.

SUMMARY OF THE INVENTION

The invention provides a display device with good light emitting uniformity at different viewing angles.

The other objectives and advantages of the invention may be further understood from the technical features disclosed in the invention.

In order to achieve one, part, or all of the abovementioned objectives or other objectives, an embodiment of the invention provides a display device, which includes a display panel and at least one optical device. The display panel has a display region and a display surface. The at least one optical device is overlapped with the display panel. The optical device has a low-reflectivity sealant pattern. An angle of 45 degrees is included between the display surface of the display panel and a connecting line of a side edge of the display region and the low-reflectivity sealant pattern. An inner edge of the low-reflectivity sealant pattern and the display region are located on the same side of the connecting line.

Based on the above, in the display device of one embodiment of the invention, the optical device is overlapped with the display panel and has the low-reflectivity sealant pattern adjacent to the side edge of the display region of the display panel. Accordingly, part of beams incident to the optical device may be effectively inhibited from being transmitted to human eyes by (diffuse) reflection of the sealant pattern. In other words, the display device may be prevented from side light leakage, the visibility of the sealant pattern at a large viewing angle may be reduced, and the light emitting uniformity of the display device is further improved.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

In the following detailed description of the preferred embodiments, reference is made to the accompanying drawings which form a part hereof, and in which are shown by way of illustration specific embodiments in which the invention may be practiced. In this regard, directional terminology, such as "top," "bottom," "front," "back," etc., is used with reference to the orientation of the Figure(s) being described. The components of the invention can be positioned in a number of different orientations. As such, the directional terminology is used for purposes of illustration and is in no way limiting. On the other hand, the drawings are only schematic and the sizes of components may be exaggerated for clarity. It is to be understood that other embodiments may be utilized and structural changes may be made without departing from the scope of the invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted" and variations thereof herein are used broadly and encompass direct and indirect connections, couplings, and mountings. Similarly, the terms "facing," "faces" and variations thereof herein are used broadly and encompass direct and indirect facing, and "adjacent to" and variations thereof herein are used broadly and encompass directly and indirectly "adjacent to". Therefore, the description of "A" component facing "B" component herein may contain the situations that "A" component directly faces "B" component or one or more additional components are between "A" component and "B" component. Also, the description of "A" component "adjacent to" "B" component herein may contain the situations that "A" component is directly "adjacent to" "B" component or one or more additional components are between "A" component and "B" component. Accordingly, the drawings and descriptions will be regarded as illustrative in nature and not as restrictive.

Figure 1:
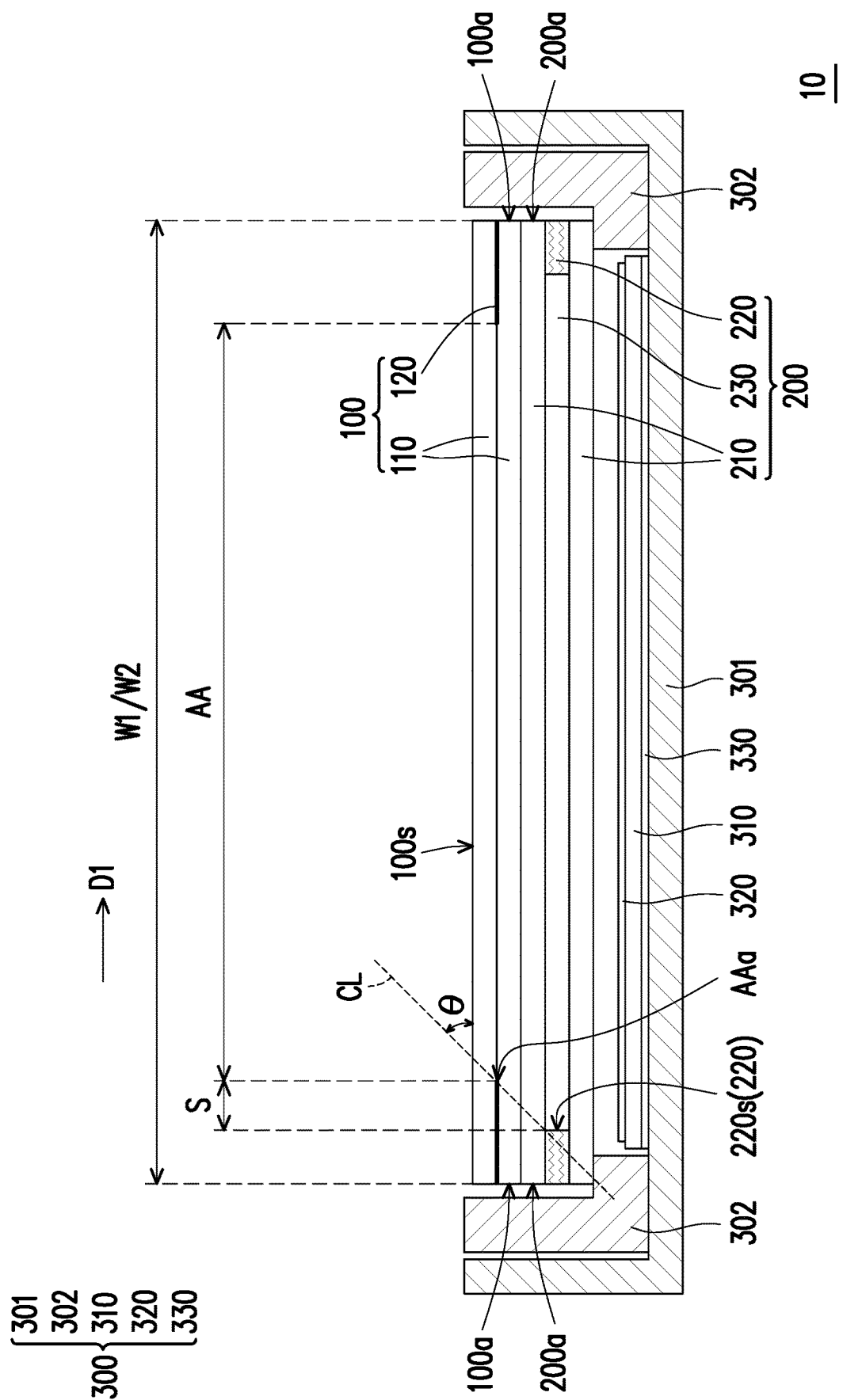
FIG. 1 is a cross-sectional view of a display device according to a first embodiment of the invention.
Figure 2:
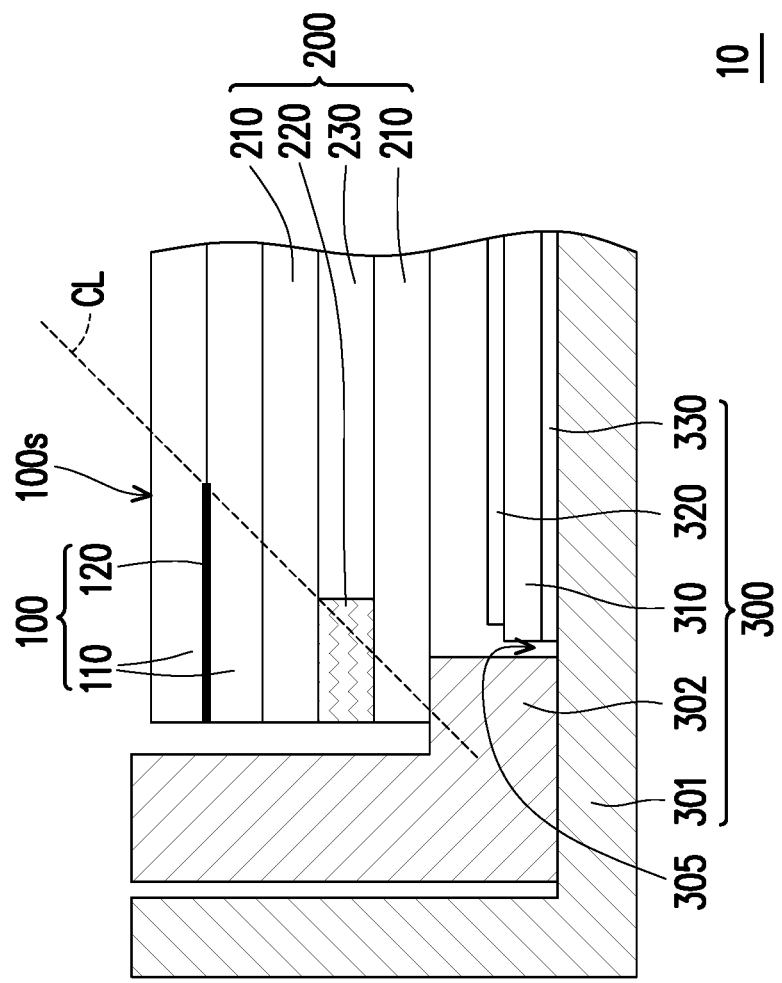
FIG. 2 is an enlarged view of a local region of the display device in FIG. 1.

FIG. 1 is a cross-sectional view of a display device according to a first embodiment of the invention. FIG. 2 is an enlarged view of a local region of the display device in FIG. 1. Referring to FIG. 1, the display device 10 includes a display panel 100 and an optical device 200. The display panel 100 is overlapped with the optical device 200 and has a display region AA and a display surface 100s. In the embodiment, the display panel 100 may be a liquid crystal display panel, an electrophoretic display panel or another non-self-luminous display panel. However, the invention is not limited thereto. In other embodiments, the display panel 100 may also be an organic light emitting diode (OLED) panel, a micro light emitting diode (micro LED) panel or another self-luminous display panel.

In the embodiment, the display panel 100 may include two substrates 110 and a light shielding pattern 120 interposed between the two substrates 110. The light shielding pattern 120 may define the display region AA of the display panel 100. For example, the display panel 100 may further include a display medium layer (not shown) interposed between the two substrates 110, and the display medium layer includes, for example, a plurality of liquid crystal molecules or a plurality of charged particles. It is to be noted that a component composition and configuration relationship of the display panel are not limited in the invention. Those skilled in the art should know that the display panel 100 may be implemented by any component, well-known to those skilled in the art, for display panels, and thus the descriptions thereof are omitted herein.

On another aspect, the optical device 200 includes two substrates 210, a low-reflectivity sealant pattern 220 and an optical structure layer 230. The low-reflectivity sealant pattern 220 is interposed between the two substrates 210 and configured to joint the two substrates 210. The optical structure layer 230 is disposed between the two substrates 210 and the low-reflectivity sealant pattern 220. The low-reflectivity sealant pattern 220 has an inner edge 220s facing the optical structure layer 230. In the embodiment, a material of the low-reflectivity sealant pattern 220 is, for example, a black frame sealant. However, the invention is not limited thereto. In other embodiments, the material of the low-reflectivity sealant pattern 220 may also be a low-reflectivity sealant material or another sealant material suitable for absorbing visible light. In the embodiment, a material of the substrates 110 of the display panel 100 and the substrates 210 of the optical device 200 may include a rigid substrate (for example, glass and quartz) or a flexible substrate (for example, a polyimide (PI) film, a polyester (PET) film or another suitable organic polymer). However, the invention is not limited thereto.

In the embodiment, the optical structure layer 230 is, for example, composed of a plurality of liquid crystal molecules (not shown) and a plurality of electrode patterns (not shown), and is configured to perform phase modulation on a beam incident to the optical device 200. Those skilled in the art should understand that, for phase modulation, the optical device 200 may further selectively include two polarizers (not shown) and the two polarizers are arranged on two sides, far away from the optical structure layer 230, of the two substrates 210 and configured for polarization of the incident beam. In other words, the optical device 200 of the embodiment may be an electrically controlled phase retarder, an electrically controlled liquid crystal grating (LC grating) or an electrically controlled liquid crystal lens (LC lens). However, the invention is not limited thereto. In other embodiments, the optical device may also be an electrically controlled viewing-angle switch device, a stereoscopic display module or another optical component suitable for changing beam characteristics (for example, an optical path length, a phase, an intensity and a wavelength distribution).

On another aspect, in the embodiment, the display device 10 may further include a backlight module 300. The optical device 200 is arranged between the display panel 100 and the backlight module 300. However, the invention is not limited thereto. In other embodiments, the display device 10 may not have the backlight module 300 (that is, the display panel 100 may be a self-luminous display panel). Specifically, the backlight module 300 is suitable for providing the light beam (not shown), and the light beam, after sequentially passing through the optical device 200 and the display panel 100, forms an image beam and is transmitted into human eyes (not shown) on one side, with the display surface 100s, of the display panel 100 to generate a display picture.

Referring to FIG. 1, it can be seen that an angle θ is included between the display surface 100s of the display panel 100 and a connecting line CL of a side edge AAa of the display region AA of the display panel 100 and the low-reflectivity sealant pattern 220 (for example, but not limited to, a top end of the inner edge 220s) of the optical device 200, and in the embodiment, the angle θ may be 45 degrees. It is to be noted that the numerical value of the angle θ is not any set value but depends on an inspection specification of the display device 10 or another inspection standard. For example, the optical performance (for example, the light emitting uniformity, brightness and contrast of the display region AA) of the display device 10 at a side viewing angle of 45 degrees is measured. In other words, those skilled in the art of the invention should understand that the set numerical value of the angle θ may be adjusted to be, for example, 60 degrees, according to a practical product specification design, and the invention is not limited by the contents disclosed in the figure.

It is to be mentioned that the inner edge 220s of the low-reflectivity sealant pattern 220 and the display region AA of the display panel 100 are located on the same side of the connecting line CL. Specifically, the connecting line CL of the side edge AAa of the display region AA of the display panel 100 and the low-reflectivity sealant pattern 220 of the optical device 200 penetrates through the low-reflectivity sealant pattern 220. That is, part of the low-reflectivity sealant pattern 220 is within a field of vision of the human eyes on one side, with the display surface 100s, of the display panel 100 at the side viewing angle of 45 degrees. Based on this, the low-reflectivity sealant pattern 220 may be made from a black frame sealant material or another low-reflectivity frame sealant material to reduce the visibility thereof in the human eyes.

In the embodiment, an assembling precision (preset) spacing S is included between the inner edge 220s of the low-reflectivity sealant pattern 220 and the side edge AAa of the display region AA in a direction (i.e., direction D1) parallel to the display surface 100s, and the spacing S may be ranged from 0.3 mm to 1 mm. However, the invention is not limited thereto. According to other embodiments, the assembling precision (preset) spacing S between the inner edge 220s of the low-reflectivity sealant pattern 220 and the side edge AAa of the display region AA may also be adjusted according to a thickness of the substrate 110 of the display panel 100 and a thickness of the substrate 210 of the optical device 200. For example, in case of not considering the assembling precision (or bonding precision) of the display panel 100 and the optical device 200, the inner edge 220s of the low-reflectivity sealant pattern 220 may also be aligned with the side edge AAa of the display region AA in a normal direction of the display surface 100s. Since the low-reflectivity sealant pattern 220 has relatively low reflectivity, the inner edge 220s thereof aligned with the side edge AAa of the display region AA is still concealed well and hard to be viewed by the human eyes (i.e., user).

From another point of view, for implementing a bezel less (narrow bezel) design of the display device 10, the low-reflectivity sealant pattern 220 of the optical device 200 requires to be arranged adjacent to the side edge AAa of the display region AA (namely the spacing S is shortened), and even the low-reflectivity sealant pattern 220 of the optical device 200 requires to be aligned with the side edge AAa of the display region AA. Making the low-reflectivity sealant pattern 220 from a low-reflectivity material may inhibit (diffuse) reflection formed by illumination of the low-reflectivity sealant pattern 220 by the light beam from the backlight module 300 and is favourable for reducing the risk of side light leakage of the display device 10. In other words, the light emitting uniformity of the display device 10 at different viewing angles may be improved.

It is particularly to be noted that, in the embodiment, the display panel 100 and the optical device 200 have a first width W1 and a second width W2 in the direction (i.e., the direction D1) parallel to the display surface 100s respectively, the first width W1 of the display panel 100 may substantially be equal to the second width W2 of the optical device 200, and the second width W2 of the optical device 200 may even substantially be less than the first width W1 of the display panel 100 without affecting a display effect of the display device 10. However, the invention is not limited thereto. That is, a side edge 200a of the optical device 200 may be aligned with a side edge 100a of the display panel 100 in the normal direction of the display surface 100s and a bezel width of the display device 10 is not required to be increased due to arrangement of the optical device 200, which is favourable for implementing the bezel less (narrow bezel) design of the display device 10.

On another aspect, the backlight module 300 may selectively include a backboard 301, a mold frame 302, a light guide plate 310, an optical film 320 and a reflector plate 330. The reflector plate 330, the light guide plate 310 and the optical film 320 are located between the backboard 301 and the optical device 200 and sequentially stacked on the backboard 301. The light guide plate 310 is overlapped with the display panel 100 and located on one side, far away from the display surface 100s, of the display panel 100. The mold frame 302 are disposed on two opposite sides of the light guide plate 310 and configured to hold the display panel 100 and the optical device 200. For example, the optical film 320 may include a diffuser, a prism plate or optical brightness enhancement films (BEFs) in other different forms.

It is to be mentioned that, as shown in FIG. 2, a gap 305 is included between the light guide plate 310 and the mold frame 302, and the low-reflectivity sealant pattern 220 of the optical device 200 may be overlapped with the gap 305 between the light guide plate 310 and the mold frame 302 in the normal direction of the display surface 100s. Accordingly, the low-reflectivity sealant pattern 220 of the optical device 200 may further be configured to absorb a light beam from the gap 305 of the backlight module 300. In other words, the low-reflectivity sealant pattern 220 may further be configured to shield side leaking light of the backlight module 300.

It is to be noted that, in the embodiment, for fixing a configuration relationship of the display panel 100 and the optical device 200, the display device 10 may further selectively include an adhesive layer (not shown) disposed between the display panel 100 and the optical device 200, and a material of the adhesive layer may include an optical clear adhesive (OCA), an optical clear resin (OCR) or another high-transmittance adhesive material. More specifically, a fixing relationship between the display panel 100 and the optical device 200 may be realized in a direct bonding manner. However, the invention is not limited thereto. In other embodiments, a frame shaped adhesive (tape) may also be disposed between the display panel 100 and the optical device 200, namely the fixing relationship between the display panel 100 and the optical device 200 may also be realized in an air bonding manner.

The disclosure will be described below with some embodiments in detail. The same components are marked with the same symbols, the descriptions about the same technical contents are omitted, and the omitted parts may refer to the abovementioned embodiment and will not be elaborated below.

Figure 3:
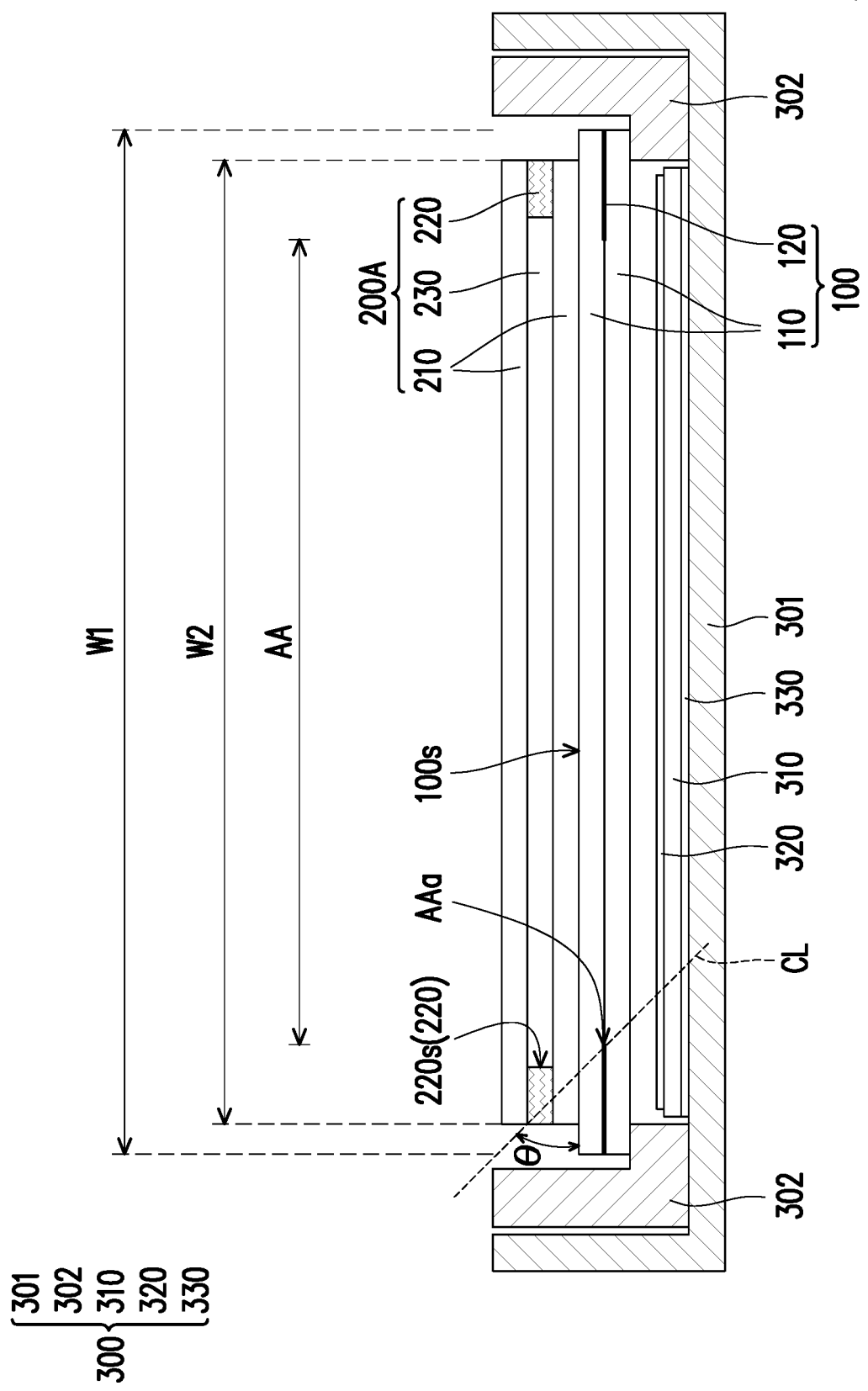
FIG. 3 is a cross-sectional view of a display device according to a second embodiment of the invention.

FIG. 3 is a cross-sectional view of a display device according to a second embodiment of the invention. Referring to FIG. 3, the main difference between the display device 11 of the embodiment and the display device 10 in FIG. 1 is that a dimension and configuration relationship of the optical device are different. In the embodiment, the optical device 200A is overlapped with the display panel 100 and disposed above the display panel 100. That is, the display panel 100 is located between the optical device 200A and the light guide plate 310. On another aspect, as shown in FIG. 3, the second width W2 of the optical device 200A may be less than the first width W1 of the display panel 100, which is favourable for implementing the bezel less design of the display device 11.

It is particularly to be noted that the low-reflectivity sealant pattern 220 of the optical device 200A has a relatively low reflectivity (or a relatively high absorbance) and thus may still be concealed well and hard to be viewed by the human eyes under illumination of the image beam or a light beam from an external environment (for example, one side, far away from the display panel 100, of the optical device 200A).

Figure 4:
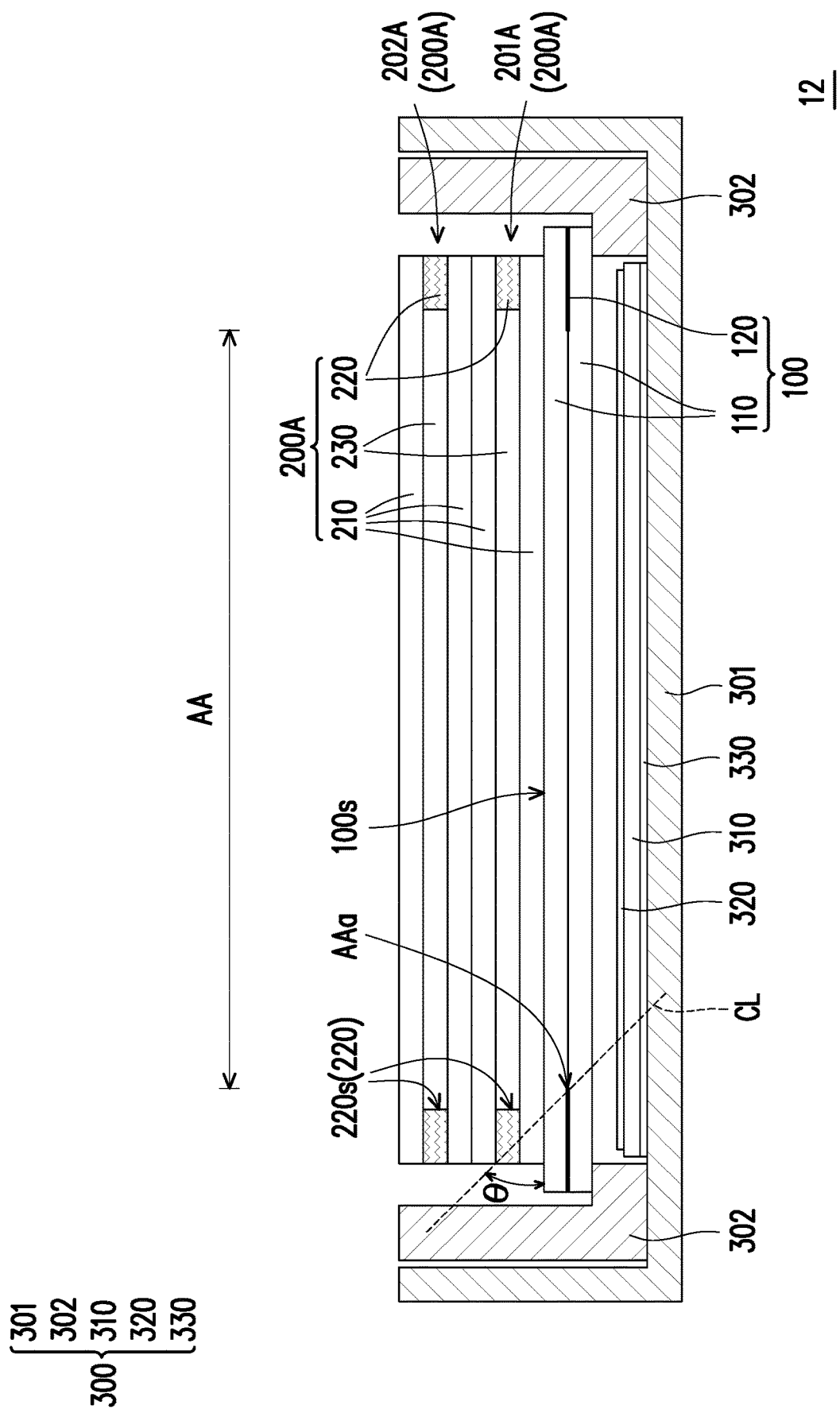
FIG. 4 is a cross-sectional view of a display device according to a third embodiment of the invention.

FIG. 4 is a cross-sectional view of a display device according to a third embodiment of the invention. Referring to FIG. 4, the main difference between the display device 12 of the embodiment and the display device 11 in FIG. 3 is the quantity of the optical device 200A. In the embodiment, two optical devices 200A, for example, an optical device 201A and an optical device 202A are included. For example, a dimension of the optical device 201A may substantially be equal to a dimension of the optical device 202A, and the optical device 201A and the optical device 202A may be mutually aligned in the normal direction of the display surface 100s and are sequentially stacked on the display panel 100. However, the invention is not limited thereto. In the embodiment, the low-reflectivity sealant pattern 220 of the optical device 200A (for example, the optical device 201A and the optical device 202A) has a relatively low reflectivity (or a relatively high absorbance) and thus may still be concealed well and hard to be viewed by the human eyes under illumination of the image beam or the beam from the external environment (for example, one side, far away from the display panel 100, of the optical device 200A).

Figure 5:
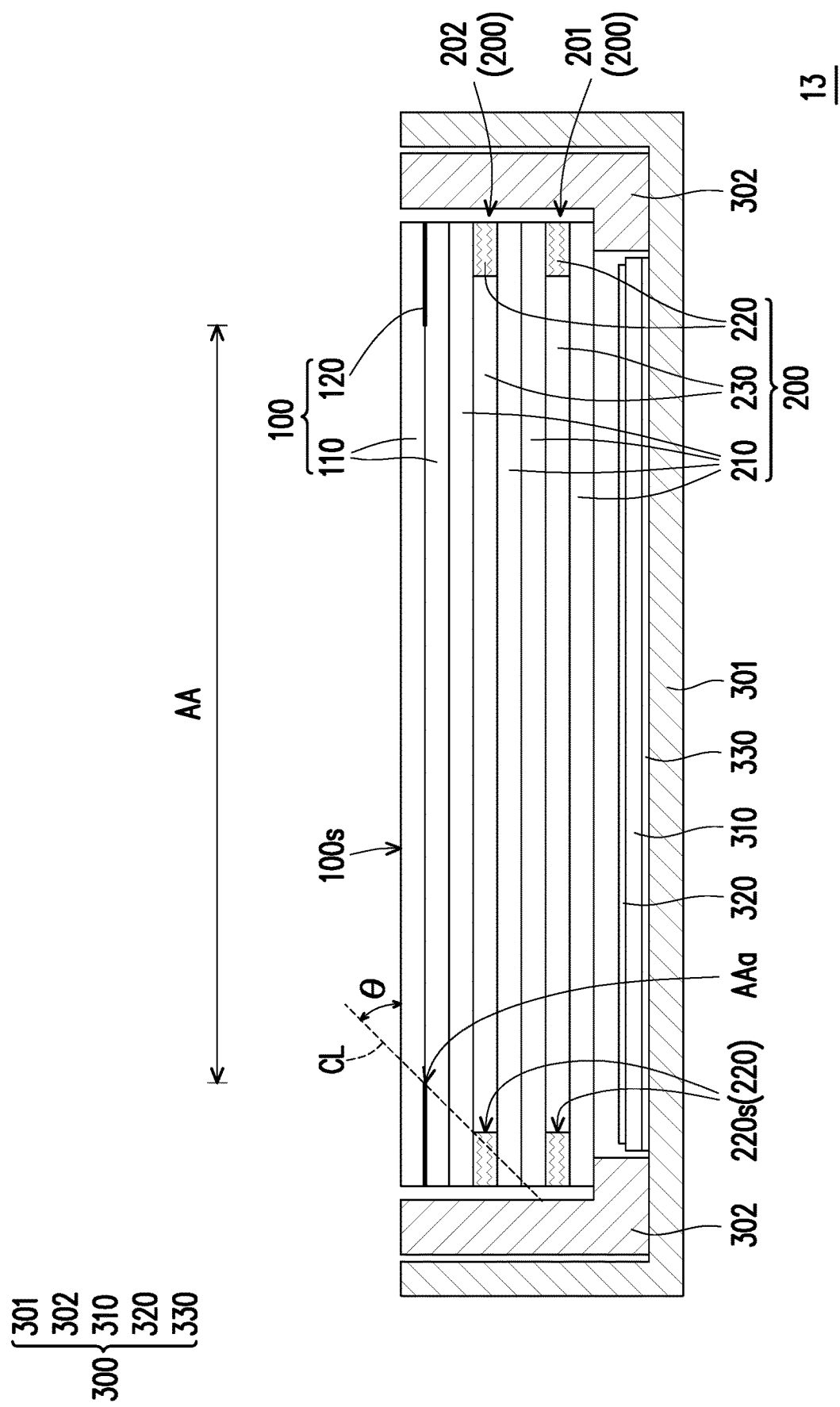
FIG. 5 is a cross-sectional view of a display device according to a fourth embodiment of the invention.

FIG. 5 is a cross-sectional view of a display device according to a fourth embodiment of the invention. Referring to FIG. 5, the main difference between the display device 13 of the embodiment and the display device 10 in FIG. 1 is the quantity of the optical device 200. In the embodiment, two optical devices 200, for example, an optical device 201 and an optical device 202 are included. For example, a dimension of the optical device 201 may substantially be equal to a dimension of the optical device 202, and the optical device 201 and the optical device 202 may be mutually aligned in the normal direction of the display surface 100s and are sequentially stacked on the light guide plate 310. However, the invention is not limited thereto. In the embodiment, the low-reflectivity sealant pattern 220 of the optical device 200 (for example, the optical device 201 and the optical device 202) has a relatively low reflectivity (or a relatively high absorbance) and thus may still be concealed well and hard to be viewed by the human eyes under illumination of the beam from the backlight module 300.

Figure 6:
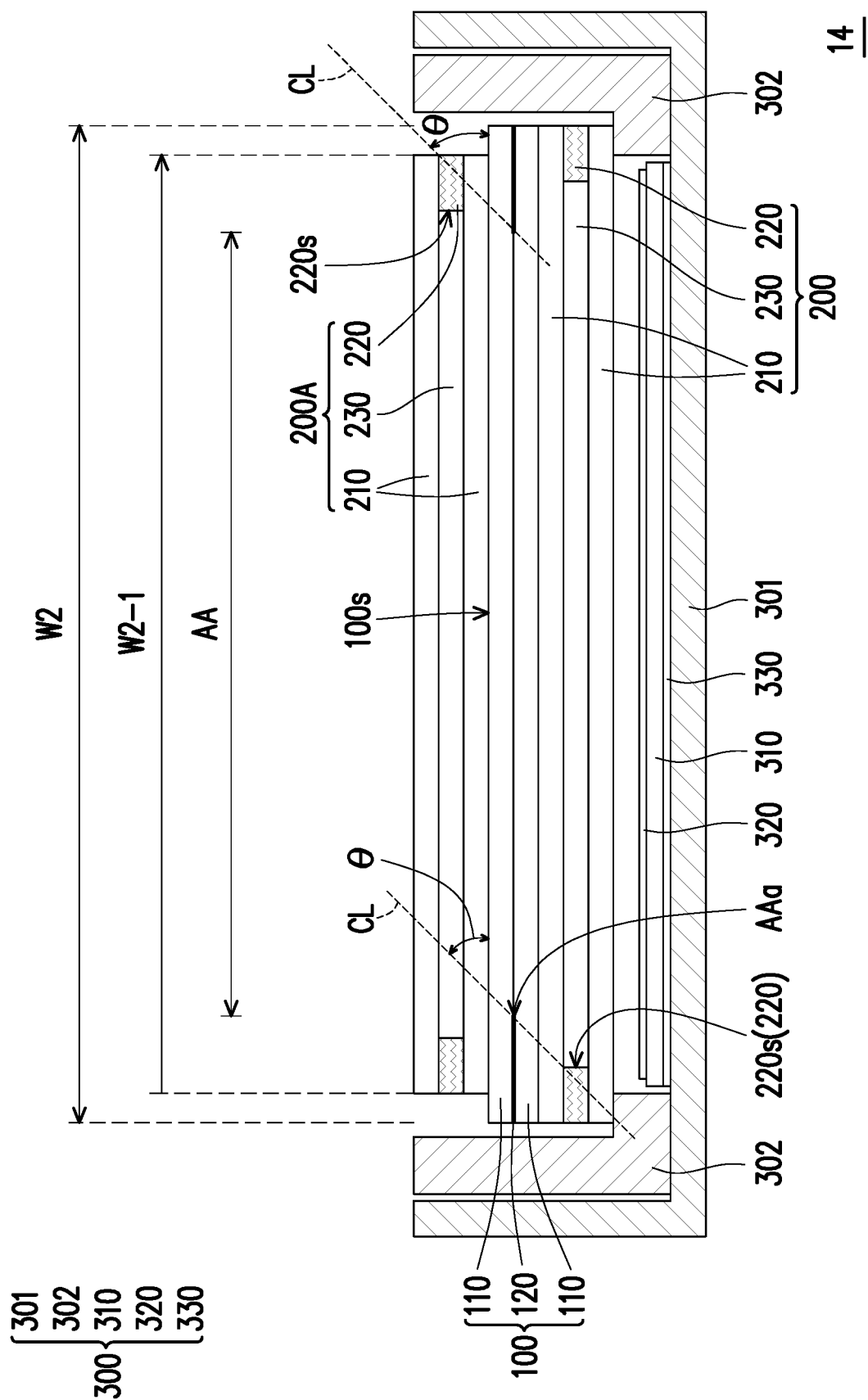
FIG. 6 is a cross-sectional view of a display device according to a fifth embodiment of the invention.

FIG. 6 is a cross-sectional view of a display device according to a fifth embodiment of the invention. Referring to FIG. 6, the main difference between the display device 14 of the embodiment and the display device 10 in FIG. 1 is the quantity and dimensional relationship of the optical device. In the embodiment, two optical devices 200, for example, a (first) optical device 200 and a (second) optical device 200A are included, and the display panel 100 is located between the optical device 200 and the optical device 200A. On another aspect, the second width W2-1 of the optical device 200A located above the display panel 100 may selectively be less than the second width W2 of the optical device 200 located below the display panel 100. However, the invention is not limited thereto. In other embodiments, the second width W2-1 of the optical device 200A located above the display panel 100 may also substantially be equal to the second width W2 of the optical device 200 located below the display panel 100. In the embodiment, both of the two low-reflectivity sealant patterns 220 of the optical device 200 and the optical device 200A have relatively low reflectivities (or relatively high absorbances), and thus may still be concealed well and hard to be viewed by the human eyes under illumination of the beam from the backlight module 300, the image beam or the beam from the external environment (for example, the side, far away from the display panel 100, of the optical device 200A).

Based on the above, in the display device of one embodiment of the invention, the optical device is overlapped with the display panel and has the low-reflectivity sealant pattern adjacent to the side edge of the display region of the display panel. Accordingly, part of light beams incident to the optical device may be effectively inhibited from being transmitted to human eyes by (diffuse) reflection of the sealant pattern. In other words, the display device may be prevented from side light leakage, the visibility of the sealant pattern at a large viewing angle may be reduced, and the light emitting uniformity of the display device is further improved.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the invention as defined by the following claims. Moreover, no element and component in the disclosure is intended to be dedicated to the public regardless of whether the element or component is explicitly recited in the following claims.

What is claimed is:

1. A display device, comprising:
a display panel, having a display surface with side edges defining a display region;
a backlight module, having a light guide plate, wherein the backlight module is suitable for providing a light beam to the display panel;
at least one optical device, overlapped with the display panel, the optical device comprises two substrates and a low-reflectivity sealant pattern, the low-reflectivity sealant pattern is interposed between the two substrates, and
a connecting line provided by one of the side edges of the display region and the low-reflectivity sealant pattern,
wherein an angle of 45 degrees is included between the display surface of the display panel and the connecting line, and an inner edge of the low-reflectivity sealant pattern and the display region being located on the same side of the connecting line.

2. The display device according to claim 1, wherein a spacing is included between the inner edge of the low-reflectivity sealant pattern and the one of the side edges of the display region in a direction parallel to the display surface, and the spacing is ranged from 0.3 mm to 1 mm.

3. The display device according to claim 1, wherein the display panel has a first width in the direction parallel to the display surface, the optical device has a second width in the direction parallel to the display surface, and the second width is less than or equal to the first width.

4. The display device according to claim 1, wherein the light guide plate is overlapped with the display panel and positioned on one side, far away from the display surface, of the display panel, and the at least one optical device is located between the display panel and the light guide plate.

5. The display device according to claim 4, further comprising a mold frame, disposed on two opposite sides of the light guide plate, wherein a gap is included between the light guide plate and the mold frame, and the low-reflectivity sealant pattern of the optical device is overlapped with the gap.

6. The display device according to claim 1, wherein the light guide plate is overlapped with the display panel and positioned on one side, far away from the display surface, of the display panel, and the display panel is located between the at least one optical device and the light guide plate.

7. The display device according to claim 1, wherein the at least one optical device comprises a first optical device and a second optical device, and the display panel is located between the first optical device and the second optical device.

8. The display device according to claim 1, wherein the optical device is an electrically controlled viewing-angle switch device.

9. The display device according to claim 1, wherein a material of the low-reflectivity sealant pattern includes a black frame sealant.

* * * * *